US009459674B2

(12) United States Patent
Lin et al.

(10) Patent No.: US 9,459,674 B2
(45) Date of Patent: Oct. 4, 2016

(54) POWER INTEGRATION MODULE AND ELECTRONIC DEVICE

(71) Applicant: ASUSTeK COMPUTER INC., Taipei (TW)

(72) Inventors: Yi-Peng Lin, Taipei (TW); Kuan-Kun Tang, Taipei (TW); Pei-Jung Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 447 days.

(21) Appl. No.: 14/072,798

(22) Filed: Nov. 6, 2013

(65) Prior Publication Data

US 2014/0143571 A1    May 22, 2014

(30) Foreign Application Priority Data

Nov. 21, 2012 (CN) .......................... 2012 1 0477108

(51) Int. Cl.
*H02J 1/00* (2006.01)
*H02J 3/00* (2006.01)
*G06F 1/26* (2006.01)
*H02J 1/10* (2006.01)
*H02J 9/00* (2006.01)

(52) U.S. Cl.
CPC .............. *G06F 1/263* (2013.01); *G06F 1/266* (2013.01); *H02J 1/102* (2013.01); *H02J 9/00* (2013.01)

(58) Field of Classification Search
USPC ............................................. 307/80, 86, 87
See application file for complete search history.

(56) References Cited

U.S. PATENT DOCUMENTS

| 4,937,463 A * | 6/1990 | Kobayashi | ............... H02J 3/46 307/84 |
| 7,443,053 B2 * | 10/2008 | Chen | ..................... G06F 1/263 307/44 |

FOREIGN PATENT DOCUMENTS

| CN | 201570275 U | 9/2010 |
| CN | 201797020 U | 4/2011 |
| CN | 102081449 A | 6/2011 |

* cited by examiner

*Primary Examiner* — Rexford Barnie
*Assistant Examiner* — Dru Parries
(74) *Attorney, Agent, or Firm* — CKC & Partners Co., Ltd.

(57) ABSTRACT

A power integration module includes a first input connector, a second input connector, an output connector, a switch unit, a determining unit. The first input connector and the second input connector are electrically connected to a first power supply and a second power supply of a power supply module. The output connector is electrically connected to an electrical load. The switch unit is coupled between the first input connector, the second input connector and the output connector. When the switch unit is turned on, the first input power supply and the second input power supply are integrated in parallel and outputted to the output connector to the electrical load. Moreover, an electronic device with a plurality of power integration modules is provided. Thus, the wrong connection is prevented and the condition that the power supplies of different electrical parameters are connected in parallel is avoided.

7 Claims, 4 Drawing Sheets

POWER INTEGRATION MODULE AND ELECTRONIC DEVICE

CROSS-REFERENCE TO RELATED APPLICATION

This application claims the priority benefit of CN application serial No. 201210477108.0 filed on Nov. 21, 2012. The entirety of the above-mentioned patent application is hereby incorporated via reference herein and made a part of specification.

BACKGROUND OF THE INVENTION

1. Field of the Invention

This disclosure relates to a power supply technology and, more particularly, to a power supply architecture integrating a plurality of power supplies.

2. Description of the Related Art

With the development of technology, the complexity of an electronic device increases along with the demand of the user. The electronic elements in the electronic device provide more functions, faster processing speed, but consume more power. The electrical loads in the electronic device need stable power supply to maintain stable performance.

For example, a high level graphic card in a computer needs to operate huge burden of floating-point operations, and therefore it may consume great electric power. In the condition of over clocking, over voltage, or having two or more graphic processing units, the power consumption may exceed the specifications of the computer and cause the power supply with less power capacity to support the computer. In this situation, the graphics card may not operate smoothly and even damage.

Some graphic cards not only have one original power supply, but also have one extra power supply to get more powers. However, the power outputted to power transmission line by the power supply is constant, and an extra power supply merely makes the graphic card get double inputted power.

BRIEF SUMMARY OF THE INVENTION

A power integration module is provided to integrate a plurality of power supply signals to an integrated power supply signal of larger power. Furthermore, the power integration module includes a determining unit to determine whether the characteristic parameters of the input power supplies are consistent to prevent wrong connection, and the condition that the power supplies of different characteristic parameters are connected in parallel is avoided.

The power integration module is used to integrate a plurality of power supplies of a power supply module and then output them to an electrical load. The power integration module includes a first input connector, a second input connector, an output connector, a switch unit and a determining unit. The first input connector is electrically connected to a first input power supply of the power supply module. The second input connector is electrically connected to a second input power supply of the power supply module. The output connector is electrically connected to the electrical load. The switch unit is coupled between the first input connector, the second input connector and the output connector. The determining unit is connected to the first input connector and the second input connector respectively to control the switch unit to be turned on or off. When the switch unit is turned on, the first input power supply and the second input power supply is integrated in parallel by the switch unit to an integrated power to be outputted to the output connector, and the integrated power is outputted to the electrical load via the output connector.

In one embodiment, the determining unit includes a first power supply sensor, a second power supply sensor and a determining circuit. The first power supply sensor is used to detect the characteristic parameters of the first input power supply. The second power supply sensor is used to detect the characteristic parameters of the second input power supply. The determining circuit is used to determine whether the characteristic parameters of the first input power supply and the second input power supplies are consistent, and a control signal is generated and outputted to the switch unit according to the determining result.

In one embodiment, the characteristic parameters include the respective booting time or the respective voltage levels of the first input power supply and the second input power supply.

In one embodiment, the switch unit includes a first switch element and a second switch element. The first switch element is coupled between the first input connector and the output connector. The second switch element is coupled between the second input connector and the output connector, and the control signal generated by the determining circuit is used to control the first switch element and the second switch element to be turned on or off.

In one embodiment in this disclosure, when the determining unit determines that the characteristic parameters are inconsistent, the determining unit turns off the switch unit and sends out the feedback signal to switch the power supply module into a standby state temporarily.

In one embodiment in this disclosure, the power integration module further includes an alert unit, and the feedback signal is used to drive the alert unit to send out an alert message.

An electronic device is provided to connect a plurality of power supplies in parallel and output them to an electrical load. The electronic device includes a plurality of power supply modules, a first power integration module and a second power integration module. The power supply modules are used to generate a plurality of input power supplies respectively. The first power integration module is coupled to a first part of the input power supplies. The first power integrated module determines whether the input power supplies in the first part have same characteristic parameters, and the input power supplies is selectively integrated in parallel according to the determining result and outputted to the electrical load. The second power integration module is coupled to a second part of the input power supplies. The second power integration module determines whether the input power supplies in the second part have same characteristic parameters, and the input power supplies in the second part is selectively integrated in parallel according to the determining result and outputted to the electrical load.

In one embodiment, the electronic device further includes a control unit and a delay unit. When the electronic device boots up, a first power on signal and a second power on signal are generated by the control unit and outputted to the first power supply module and the second power supply module. The delay unit is disposed between the control unit and the second power supply module, the delay unit makes the booting time of the second power supply module be different to that of the first power supply module.

In one embodiment, the first power integration module includes a determining unit and a first switch unit, the first determining unit is used to determine whether the power supplies have same characteristic parameters, and then the control signal is selectively generated and sent to the first switch unit according to the determining result. The power integration module includes a second determining unit and a second switch unit, the second determining unit is used to determine whether the power supplies have same characteristic parameters, and then the control signal is selectively generated and sent to the second switch unit according to the determining result.

According to one embodiment in this disclosure, the first determining unit further includes a plurality of power supply sensors to detect the characteristic parameters of the power supplies in the first part, the second determining unit further includes a plurality of power supply sensors to detect the characteristic parameters of the power supplies in the second part.

DETAILED DESCRIPTION OF THE EMBODIMENTS

Figure 1:
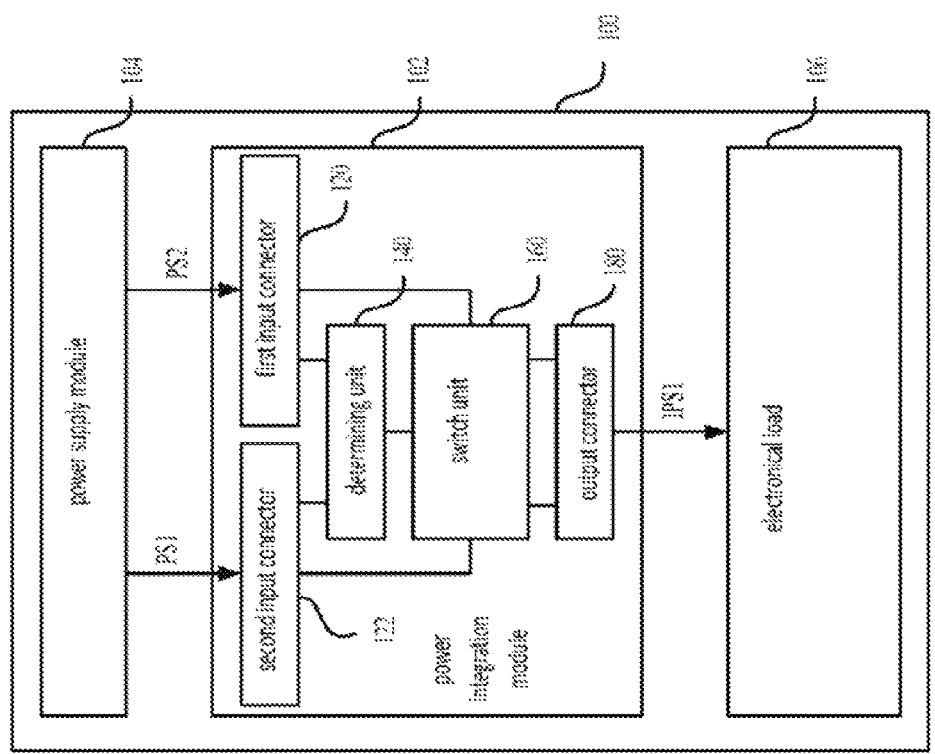
FIG. 1 is a schematic diagram showing an electronic device in one embodiment.

FIG. 1 is a schematic diagram showing an electronic device 100 in one embodiment. The electronic device 100 includes a power supply module 104, an electrical load 106 and a power integration module 102, and the power integration module 102 is coupled between the power supply module 104 and the electrical load 106. The electrical load 106 may be a load of high power consumption such as a graphic card or a processor. The power integration module 102 integrates the first input power supply PS1 and the second input power supply PS2 provided by the power supply module 104 to an integrated power supply IPS1, and the integrated power supply IPS1 is outputted to the electrical load 106. The number of the input power supply integrated to one is not limited at two herein. When the power needed by the electrical load 106 is higher, the power integration module 102 also can integrate three or more power supplies.

The power integration module 102 includes a first input connector 121, a second input connector 122, a determining unit 140, a switch unit 160 and an output connector 180. The first input connector 121 and the second input connector 122 are electrically connected to the first input power supply PS1 and the second input power supply PS2 provided by the power supply module 104 respectively. The switch unit 160 is coupled between the first input connector 121, the second input connector 122 and the output connector 180. The determining unit 140 is used to determine whether the characteristic parameters (such as the booting time or the voltage level) of the first input power supply PS1 and the second input power supply PS2 received respectively by the first input connector 121 and the second input connector 122 are consistent so as to selectively make the switch unit 160 to be turned on or off.

Figure 2:
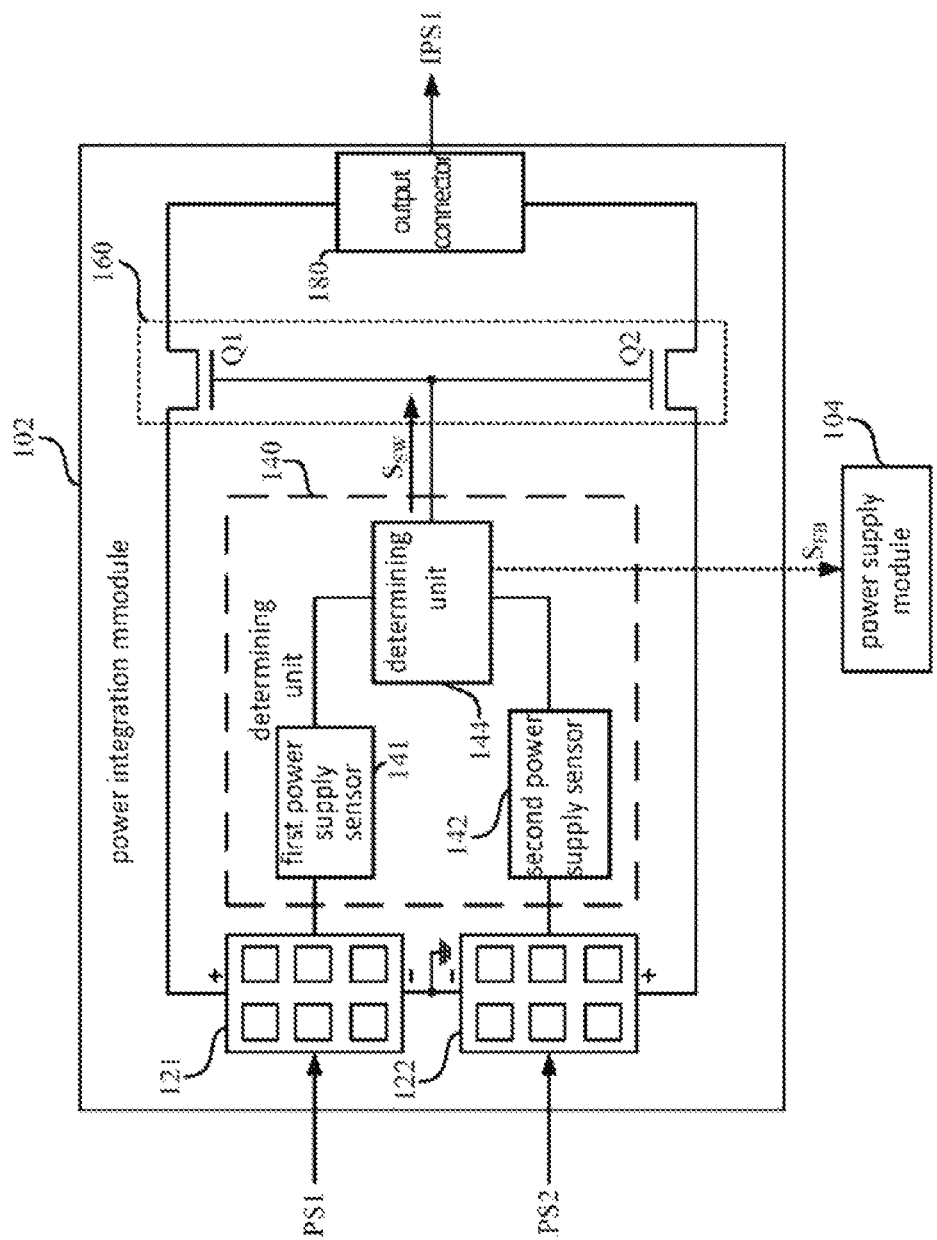
FIG. 2 is a schematic diagram showing a power integration module in FIG. 1.

FIG. 2 is a schematic diagram showing a power integration module in FIG. 1. The first input connector 121 and the second input connector 122 of the power integration module 102 are connected in parallel, and they are coupled to the output connector 180 via a first switch element Q1 and a second switch element Q2 of the switch unit 160, respectively.

Referring to FIG. 2, the determining unit 140 includes a first power supply sensor 141, a second power supply sensor 142 and a determining circuit 144. The first power supply sensor 141 and the second power supply sensor 142 are used to detect the characteristic parameters (such as a booting time) of the input power supplies (that is the first input power supply PS1 and the second input power supply PS2) connected to the first input connector 121 and the second input connector 122.

The determining circuit 144 selectively generates a control signal $S_{SW}$ to the gates of the first switch element Q1 and the second switch element Q2 according to the determining result of whether the booting time detected by the first power supply sensor 141 and the second power supply sensor 142 are consistent. For example, when the determining circuit 144 determines that the detecting results are consistent (that is the booting time of the first input power supply PS1 and the second input power supply PS2 are consistent), the switch unit 160 is turned on. Thus the first input power supply PS1 and the second input power supply PS2 are connected to the output connector 180 in parallel via the switch unit 160 by the first input connector 121 and the second input connector 122, respectively, and the integrated power supply IPS1 is outputted to the electrical load 106.

Furthermore, when the determining circuit 144 determines that the detecting result is not consistent (that is the booting time of the first input power supply PS1 and the second input power supply PS2 are not consistent), the switch unit 160 is turned off, and the integrated power supply IPS1 is stopped to output. Moreover, when the detecting results are not consistent, the determining circuit 144 sends a feedback signal $S_{FB}$ to the power supply module 104 to make the power supply module 104 turned off and switched to a standby state. Otherwise, the feedback signal $S_{FB}$ is used to drive the alert unit to send out an alert light, an alert sound or an alert message to inform the user.

According to the larger electronic device or the electrical load of great power consumption, it is not limited to one group of power supply module 104, one group of power integration module 102 and one group of integrated power supply signal IPS1 generated to the electrical load 106.

Figure 3:
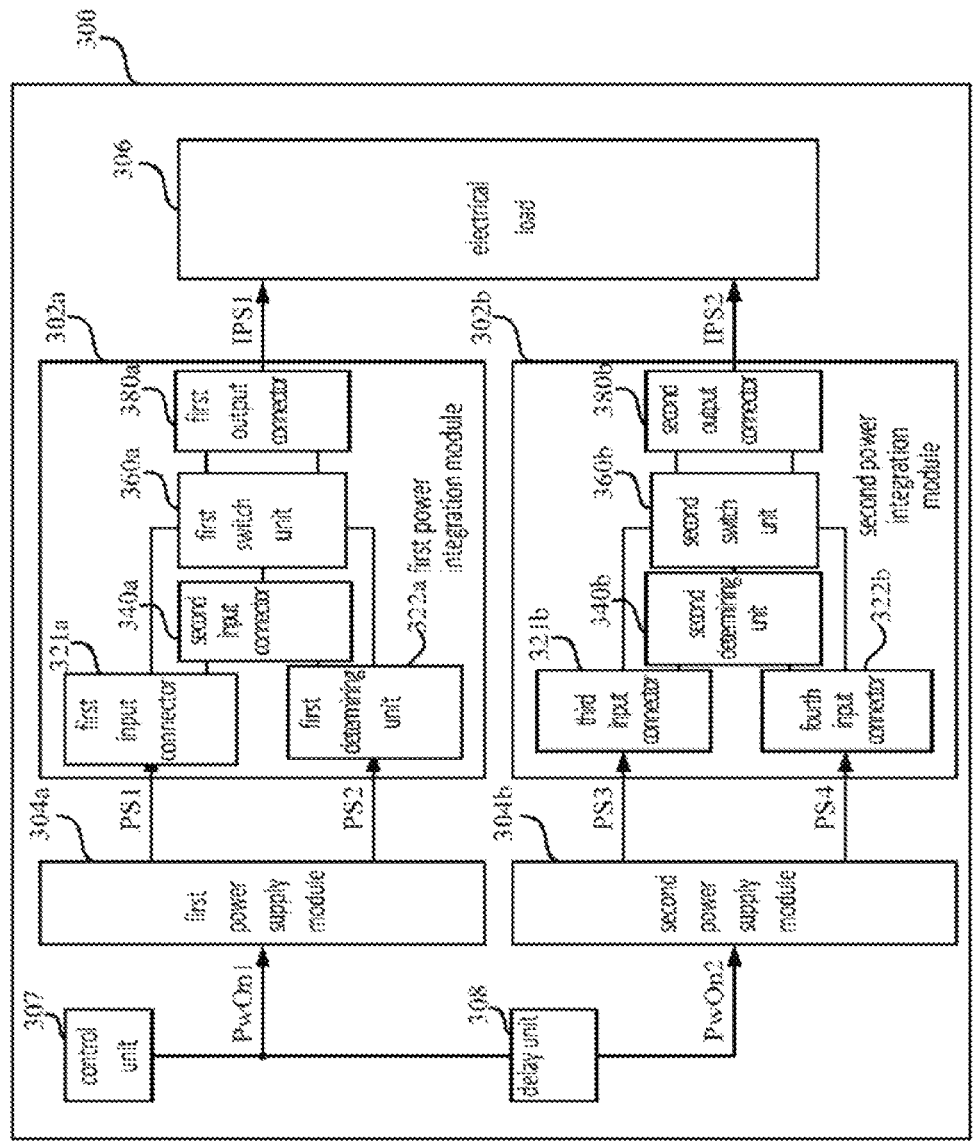
FIG. 3 is a schematic diagram showing an electronic device in another embodiment.

FIG. 3 is a schematic diagram showing an electronic device 300 in another embodiment. The electronic device 300 includes a power integration module 302a, a second power integration module 302b, a first power supply module 304a, a second power supply module 304b and an electrical load 306. The first power integration module 302a is coupled between the power supply module 304a and the electrical load 306, and the second power integration module 302b is coupled between the power supply module 304b and the electrical load 306.

The first power supply module 304a is used to generate the first input power supply PS1 and the second input power supply PS2, and the second power supply module 304b is used to generate a third input power supply PS3 and a fourth input power supply PS4.

The first power integration module 302a is coupled to a first part of the input power supplies PS1 to PS4. The first power integration module 302a determines whether the input power supplies in the first part have same characteristic parameters, and the input power supplies in the first part is integrated in parallel selectively according to the determining result and outputted to the electrical load 306. Similarly, the second power integration module 302b is coupled to the second part of the input power supplies PS1 to PS4. The second power integration module 302b determines whether the input power supplies in the second part have same characteristic parameters, and the input power supplies of the second part are integrated in parallel selectively according to the determining result and outputted to the electrical load 306.

For example, the first part of the input power supplies coupled to the power integration module 302a includes the first input power supply PS1 and the second input power supply PS2 provided by the first power supply module 304a, and the second part of the input power supplies coupled to the power integration module 302b includes the third input power supply PS3 and the fourth power supply PS4 provided by the power supply module 304b.

The first power integration module 302a is used to integrate the first input power supply PS1 and the second input power supply PS2 provided by the power supply module 304a to the integrated power supply IPS1, and the integrated power supply IPS1 is outputted to the electrical load 306. The second power integration module 302b is used to integrate the third input power supply PS3 and the fourth power supply PS4 provided by the power supply module 304b to an integrated power supply IPS2, and the integrated power supply IPS2 is outputted to the electrical load 306.

The first power integration module 302a includes a first input connector 321a and a second input connector 322a, the first determining unit 340a, the first switch 360a and the first output connector 380a. The second power integration module 302b includes a third input connector 321b, a fourth input connector 322b, a second determining unit 340b, a second switch 360b and a second output connector 380b.

The electronic device 300 further includes a control unit 307 and a delay unit 308. When the electronic device 300 is enabled, the control unit 307 generates a first power on signal PwOn1 and a second power on signal PwOn2 which are sent to make the first power supply module 304a and the second power supply module 304b operate to provide power. The delay unit 308 is disposed at the path that the control unit 307 transmits the second power on signal PwOn2 to the second power supply module 304b to make the booting time of the power supply module 304b longer than that of the power supply module 304a.

The connection relations and mechanisms of elements in the first power integration module 302a and the second power integration module 302b are similar to that of the power integration module 102 (please refer to FIG. 1), which is omitted herein.

The first power integration module 302a and the second power integration module 302b have an anti-misconnection mechanism to avoid that the power supplies of different electrical specifications are connected in parallel.

Figure 4:
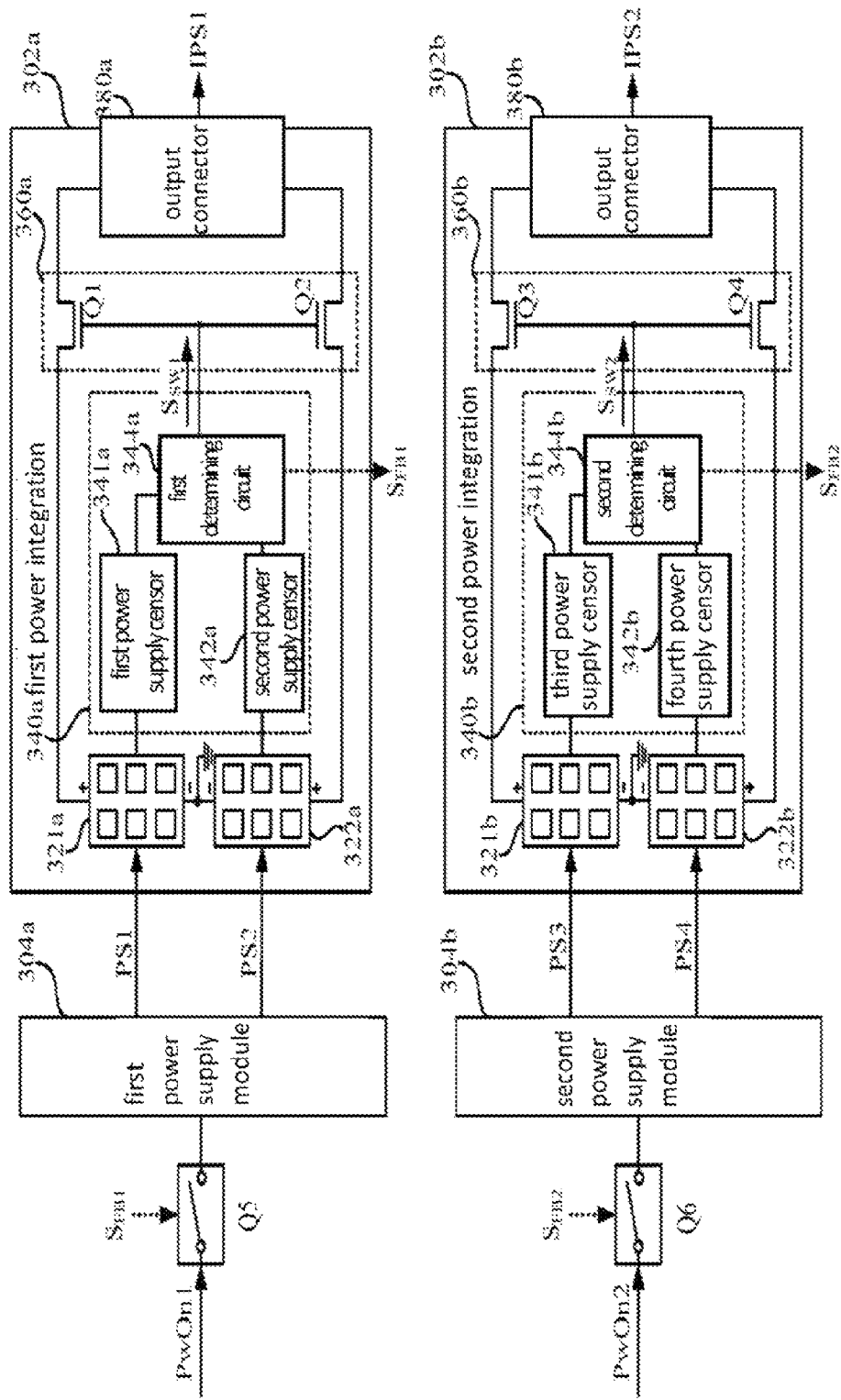
FIG. 4 is a schematic diagram showing a determining unit, a first switch, a second determining unit and a second switch in an embodiment.

FIG. 4 is a schematic diagram showing a first determining unit 340a, a first switch 360a, a second determining unit 340a and a second switch 360b in FIG. 3. The first determining unit 340a includes a first power supply sensor 341a, a second power supply sensor 342a and a first determining unit 344a. The first switch unit includes a first switch element Q1 and a second switch element Q2. The second determining unit 340b includes a third power supply sensor 341b, a fourth power supply sensor 342b and a second determining circuit 344b. The second switch unit 360b includes a third switch element Q3 and a fourth switch element Q4. The interrelations between the first determining unit 340a and the first switch unit 360a, and between the second determining unit 340b and the second switch unit 360b are similar to that between the determining unit 140 and the switch unit 160, which is omitted herein.

The first power supply module 304a may not be connected to the power supply module 304b in parallel due to different electrical parameters (such as the booting up time and the voltage level) of the power supply module 304a and the power supply module 304b.

Referring to FIG. 3 and FIG. 4, hypothetically, first part of the input power supplies coupled to the first power integration module 302a includes the first input power supply PS1 provided by the first power supply module 304a and the third input power supply PS3 provided by the second power supply module 304b. The second part of the input power supplies coupled to the second power integration module 302b includes the second input power supply PS2 provided by the first power supply module 304a and the fourth input power supply PS4 provided by the power supply module 304b.

That is, the first input connector 321a of the power integration module 302a receives the first input power supply PS1, the second input connector 322a receives the third input power supply PS3, the input connectors (the first input connector 321a and the second input connector 322a) of the first power integration module 302a are connected to two different power supply modules (the first power supply module 304a and the second power supply module 304b), respectively. When the control unit 307 sends a first power on signal PwOn1 and a second power on signal PwOn2 to the power supply module 304a and 304b, since the second power on signal PwOn2 of the second power supply module 304b delays some time by the delay unit 308, the booting time of the power supply module 304b delays that of the power supply module 304a. Consequently, the booting time that the first determining circuit 344a determines according to the first power supply sensor 341a and the second power supply sensor 342a are inconsistent, the switch unit 360a is turned off and the first integrated power supply IPS1 is stopped to output. The relationship and the operation principle among the power integration module 302b, the first power supply module 304a and the second power supply module 304b are the same to the above descriptions, which is omitted herein.

Referring to FIG. 4, a fifth switch element Q5 and a sixth switch element Q6 is disposed in the path of transmitting the first power on signal PwOn1 and the second power on signal PwOn2 to the first power supply module 304a and the second power supply module 304b. When the determining result of the first determining circuit 344a of the first power integration module 302a and that of the second determining circuit 344b of the power integration module 302b are inconsistent, the determining circuits output the feedback signals $S_{FB}1$ and $S_{FB}2$ to the fifth switch element Q5 and the sixth switch element Q6 to turn off the switches element Q5 and Q6, and the power supply module 304a and 304b are switched into the standby mode. Additionally, the feedback signal can drive the alert unit to send out an alert light, an alert sound, and an alert message to inform the user.

In sum up, the power integration module integrates a plurality of power supply signals to an integrated power supply signal with larger power. Moreover, the power integration module includes a determining unit to determine whether the characteristic parameters of the power supplies are consistent to avoid misconnection, and the condition that the power supplies of different electrical parameters are connected in parallel is avoided.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A power integration module used for integrating a plurality of power supplies of a power supply module and outputting the power supplies to an electrical load, comprising:
   a first input connector electrically connected to a first input power supply of the power supply module;
   a second input connector electrically connected to a second input power supply of the power supply module;
   an output connector electronically connected to the electrical load; and
   a switch unit comprising:
      a first switch element coupled between the first input connector and the output connector; and
      a second switch element coupled between the second input connector and the output connector; and
   a determining unit comprising:
      a first power supply sensor electrically connected to the first input connector to detect characteristic parameters of first input power supply;
      a second power supply sensor electrically connected to the second input connector to detect the characteristic parameters of the second input power supply; and
      a determining circuit configured to generate a control signal to turn on the switch unit when the first input power supply and the second input power supply have the same characteristic parameters,
   wherein the control signal generated by the determining circuit is transmitted simultaneously to the first switch element and the second switch element, and is used to control the first switch element and the second switch element to both be turned on or both be turned off,
   when the switch unit is turned on, the first input power supply and the second input power supply are integrated in parallel and outputted to the electrical load via the output connector.

2. The power integration module according to claim 1, wherein the characteristic parameters includes booting time or a voltage level of the first input power supply and the second input power supply.

3. The power integration module according to claim 1, wherein when the determining unit determines that the characteristic parameters is inconsistent, the determining unit turns off the switch unit and sends out a feedback signal to make the power supply module switched into a standby mode.

4. The power integration module according to claim 3, wherein the power integration module further includes an alert unit, and the feedback signal is used to drive the alert unit to send out an alert message.

5. An electronic device used for connecting a plurality of power supplies in parallel and outputting the power supplies to an electrical load, comprising:
   a plurality of power supply modules generating a plurality of input power supplies respectively;
   a first power integration module, and the first control signal is used to control the first switch elements to be all turned on or all turned off, wherein the first power integration module is coupled to a first part of the input power supplies and determines whether the input power supplies in the first part have same characteristic parameters, the input power supplies in the first part are selectively integrated in parallel when the input power supplies in the first part have the same characteristic parameters, the first power integration module comprises a first determining unit and a first switch unit, the first switch unit comprises a plurality of first switch elements coupled between the first part of the input power supplies and the electrical load, the first determining unit generates a first control signal simultaneously to the first switch elements of the first switch unit when the input power supplies in the first part have the same characteristic parameters; and
   a second power integration module, and the second control signal is used to control the second switch elements to be all turned on or all turned off, wherein the second power integration module is coupled to a second part of the input power supplies, the second power integration module determines whether the input power supplies in the second part have same characteristic parameters, the input power supplies in the second part are integrated in parallel and outputted to the electrical load when the input power supplies in the second part have the same characteristic parameters, the second power integration module comprises a second determining unit and a second switch unit, the second switch unit comprises a plurality of second switch elements coupled between the second part of the input power supplies and the electrical load, the second determining unit generates a second control signal simultaneously to the second switch elements of the second switch unit when the input power supplies in the second part have the same characteristic parameters.

6. The electronic device according to claim 5, further including:
   a control unit, wherein when the electronic device boots up, the control unit is used to generate a first power supply booting signal and a second power supply booting signal and send the first power supply booting signal and the second power supply booting signal to a first power supply module and a second power supply module; and
   a delay unit disposed between the control unit and the second power supply module, wherein the delay unit makes booting time of the second power supply module be different to the booting time of the first power supply module.

7. The electronic device according to claim 5, wherein the first determining unit further includes a plurality of power supply sensors for detecting the characteristic parameters of the input power supplies in the first part, and the second determining unit further includes a plurality of power supply sensors for detecting the characteristic parameters of the input power supplies in the second part.

* * * * *